United States Patent [19]
Niermann

[11] Patent Number: 5,501,635
[45] Date of Patent: Mar. 26, 1996

[54] COMBINE WITH STRAIN CHOPPER

[75] Inventor: Martin Niermann, Harsewinkel, Germany

[73] Assignee: Class oHG beschränkt haftende offene, Handelsgesellschaft, Germany

[21] Appl. No.: 354,074

[22] Filed: Dec. 6, 1994

[30] Foreign Application Priority Data

Dec. 8, 1993 [DE] Germany .................. 43 41 764.7

[51] Int. Cl.⁶ .................................................. A01F 12/40
[52] U.S. Cl. .................................. 460/112; 56/504
[58] Field of Search ........................ 460/112, 111; 56/500, 504, 505

[56] References Cited

U.S. PATENT DOCUMENTS

| | | | |
|---|---|---|---|
| 3,712,309 | 1/1973 | Schmitz | 460/112 |
| 4,669,489 | 6/1987 | Schraeder et al. | 460/112 |

FOREIGN PATENT DOCUMENTS

| | | |
|---|---|---|
| 0224803 | 11/1986 | European Pat. Off. . |
| 3119954 | 5/1981 | Germany . |
| 3826066 | 7/1988 | Germany . |

Primary Examiner—Terry Lee Melius
Attorney, Agent, or Firm—Browdy and Neimark

[57] ABSTRACT

The combine has a straw chopper (2), to the rear of a threshing and separator apparatus (1); the straw chopper can be shifted on the straw hood (3) via a movement device (4) into a working position (A) and a nonworking position.

For this purpose, this straw chopper (2) rests displaceably on guides (5, 6) of the straw hood (3) and is movable into its two positions by the movement device (4), preferably a pressure fluid cylinder. The discharge hopper (7) of the straw chopper (2), and/or a straw guide rake disposed on the straw chopper (2), are pivotable into a working position (A) and a nonworking position as a function of the displacement motion of the straw chopper (2), via coupling members (9–13).

12 Claims, 4 Drawing Sheets

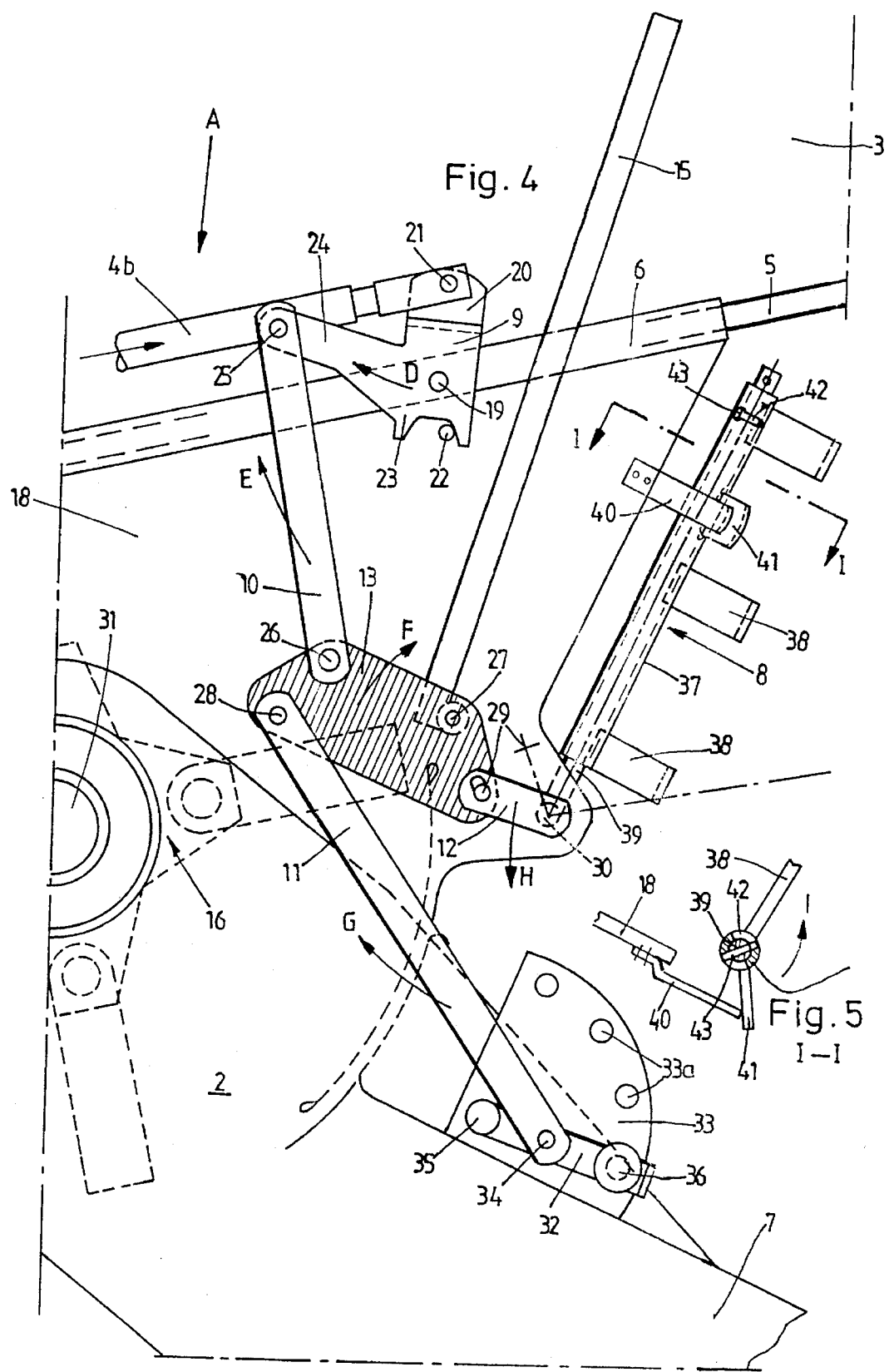

COMBINE WITH STRAIN CHOPPER

BACKGROUND OF THE INVENTION

1. Technical Field of Use

The invention relates to a combine with a straw chopper to the rear of a threshing and separator apparatus. The straw chopper is arranged to be shiftable at the straw hood into a work position and a nonworking position, via a movement device.

2. Prior Art

German Published, Non-Examined Patent Application DE-OS 31 19 954 and German Patent 2 047 023 disclose a pivoting straw chopper mounted on the straw hood about a horizontal shaft into a working position and a nonworking position, via a pressure fluid cylinder.

European Patent Application 0 224 803 discloses a combine with a chopper, supported displaceably in the region of the outlet end of the straw hood by means of a gear wheel and rack, and this chopper can likewise be shifted into both a working and non-working position. German Published, Non-Examined Patent Application DE-OS 38 26 066 discloses a straw chopper, supported pivotably on the combine, that can be swiveled into such positions manually by way of levers.

This prior art discloses only the pivotable or displaceable embodiment of the straw chopper into its chopping position or its nonworking position, and provides no suggestion of further provisions for windrowing the straw on the field, or straw chopping.

OBJECT OF THE INVENTION

The object of the invention is to, in a simple and mechanical way, shift a straw chopper, mounted on the straw hood of the combine, into a working position and a nonworking position, and in such process automatically put the discharge hopper of the straw chopper and/or a straw guide rake into the working and nonworking positions.

According to the invention, the combine is equipped with a straw chopper which is supported displaceably on guides of the straw hood, and can be put into its working position and its nonworking position by a pressure fluid cylinder.

As a function of the displacement motion of the straw chopper, the discharge hopper of the straw chopper and/or the straw guide rake and/or a straw baffle are simultaneously, necessarily and automatically put into the working and nonworking positions. Simple coupling members are present for this purpose, which execute these motions as a function of one another.

As a result, the straw chopper gains an improved function and increased commercial value, since by means of only a single actuating device multiple functions for the entire mode of operation of the straw chopper, or for its nonworking position, are achieved.

BRIEF DESCRIPTION OF THE DRAWINGS

An exemplary embodiment of the invention will be described in detail below in conjunction with the drawings. Shown are:

FIG. 4, a side view of the coupling members for displacing the straw chopper, pivoting the discharge hopper, pivoting the straw guide rake, and pivoting the straw baffle, in the chopping position of the straw chopper;

FIG. 5, a cross section through the straw guide rakes taken along the line I—I of FIG. 4 with cooperating stop and control means.

DETAILED DESCRIPTION OF THE PREFERRED EMBODIMENT(S) OF THE INVENTION

Figure 1:
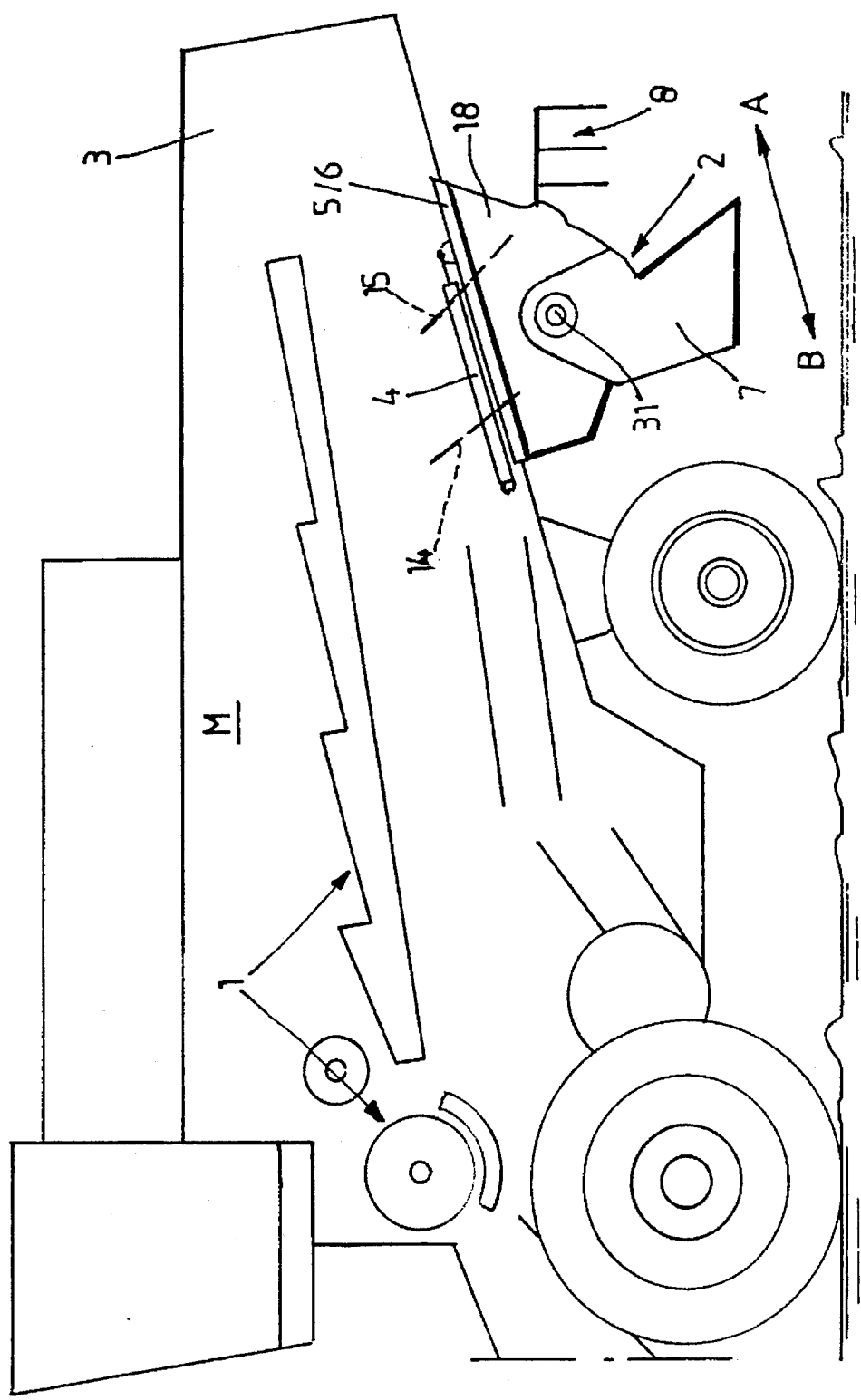
FIG. 1, a schematic side view of a combine with a straw chopper supported displaceably into two functional positions under the straw hood.

To the rear of a threshing and separator apparatus (1), the combine (M) has a straw chopper (2), which is shiftable on the straw hood (3) via a movement device (4) into a working position (A) and a nonworking position (B).

The straw chopper (2) is displaceable by means of guides (5, 6) under the straw hood (3) and is supported so as to be movable into its two positions by means of the movement device (4), which is preferably a pressure fluid cylinder.

The discharge hopper (7) of the straw chopper (2) and a straw guide rake (8) disposed on the straw chopper (2) are pivotable into a working position (A) and a nonworking position (B) via coupling members (9–13) (FIG. 4) as a function of the displacement of the straw chopper (2).

The straw chopper (2) has one fixed straw baffle (14) and one straw baffle (15) that is pivotable into a straw entry position (FIG. 2) and a straw diversion position (FIG. 3), as a function of the displacement motion of the straw chopper (2), via the other coupling members (9–13).

The straw chopper (2) is supported, by its housing (18) that receives the cutting rotor (16) and counterpart knife (17), so as to be displaceable with profile rails (6), which are preferably U-shaped, under the straw hood (3).

The pressure fluid cylinder (4), embodied as a pressure-tension cylinder that can be acted upon on both ends, is supported by its cylinder housing (4a) on the straw hood (3), and its piston rod (4b) indirectly engages the rear end of the straw chopper housing (18).

The piston rod (4b) of the pressure fluid cylinder (4) is pivotably connected to a control and pivoting part (9), which is limitedly pivotable about a horizontal shaft (19) on the straw chopper housing (18) and which effects the control of the coupling members (10–13) and the displacement of the straw chopper (2).

The control and pivoting part (9) is embodied as a multiple-armed lever and is pivotably supported about the shaft (19) provided in stationary fashion on the profile rail (6) of the straw chopper housing (18). On one side of the shaft (19), the control and pivoting part (9) has a fork element (20) for pivotable connection of the piston rod (4b) of the pressure fluid cylinder (4) by the horizontal shaft (21). On the other side of the shaft (19), control and pivoting part (9) has a pivot limitation and slaving fork (23), cooperating with a stop (22) on the straw chopper housing (18) which limits the straw chopper (2) at the working and non-working positions.

The control and pivoting part (9) also has a leverlike extension (24) extending longitudinally of the pressure fluid cylinder (4), to which a first lever (10) is pivotably connected at one end to a horizontal pivot shaft (25), and is pivotably connected by its other end, via a horizontal shaft (26), to a gusset plate (13) that is pivotably supported about a fixed horizontal shaft (27) on the straw chopper housing (18).

A second lever (11) is pivotably connected at one end to a horizontal shaft (28) on the gusset plate (13) while its other end is adjustably engaged to the discharge hopper (7).

A third lever (12) is supported pivotably at one end on the gusset plate (13) to a horizontal shaft (29), and at its other end has a shaft (30), rotatably supported in the straw chopper housing (18). The straw guide rake (8) is secured in a fixed manner against relative motion on rotatable shaft (38).

The pivotable straw baffle (15) is secured to the pivotable gusset plate (13) on the horizontal shaft (27) about which baffle (15) can be swiveled.

The discharge hopper (7) is pivotably supported about the pivot axis of rotor (31), and lever (11) that moves it, is pivotably connected to an adjusting lever (32), which is adjustably secured to a plate with holes (33) secured to the discharge hopper (7), to adjust the size of the pivot angle of the discharge hopper (7).

The lever (11) is connected via a horizontal shaft (34) to the adjusting lever (32), which in turn is pivotable by one end around a horizontal shaft (35) on the plate with holes (33) and by its other end is selectively fixable by a plug-in part (36), detent part or the like in the holes (33a) of the perforated grid part (33), and thus determines the magnitude of pivoting of the discharge hopper (7).

The stationary shaft (27) of the gusset plate (13) rests with the shafts (26, 28, 29) of the three levers (10, 11, 12) on the corners of a quadrilateral, preferably a trapezoid.

The straw guide rake (8) has a tube (37) with tines (38). Tube (37) is supported rotatably in a limited angle about a rod (39) secured to the shaft (30). The tube (37) with tines (38) is pivoted about the rod (39) toward the middle of the combine by means of a control piece (40) secured to the straw chopper housing (18) and a stop (41) mounted on the tube (37), when the straw guide rake (8) is pivoted upward.

A pair of straw guide rakes (8) are respectively disposed on each side of the straw chopper (2), and both straw guide rakes (8) are secured to a common continuous shaft (30) and can be swiveled toward one another, each by means of a respective stop (41) cooperating with a control piece (40).

The coupling members formed by the gusset plate (13), the three levers (10, 11, 12), and the control and pivoting part (9), are disposed on at least one side of the straw chopper (2) and are actuatable by the pressure fluid cylinder (4).

Figure 3:
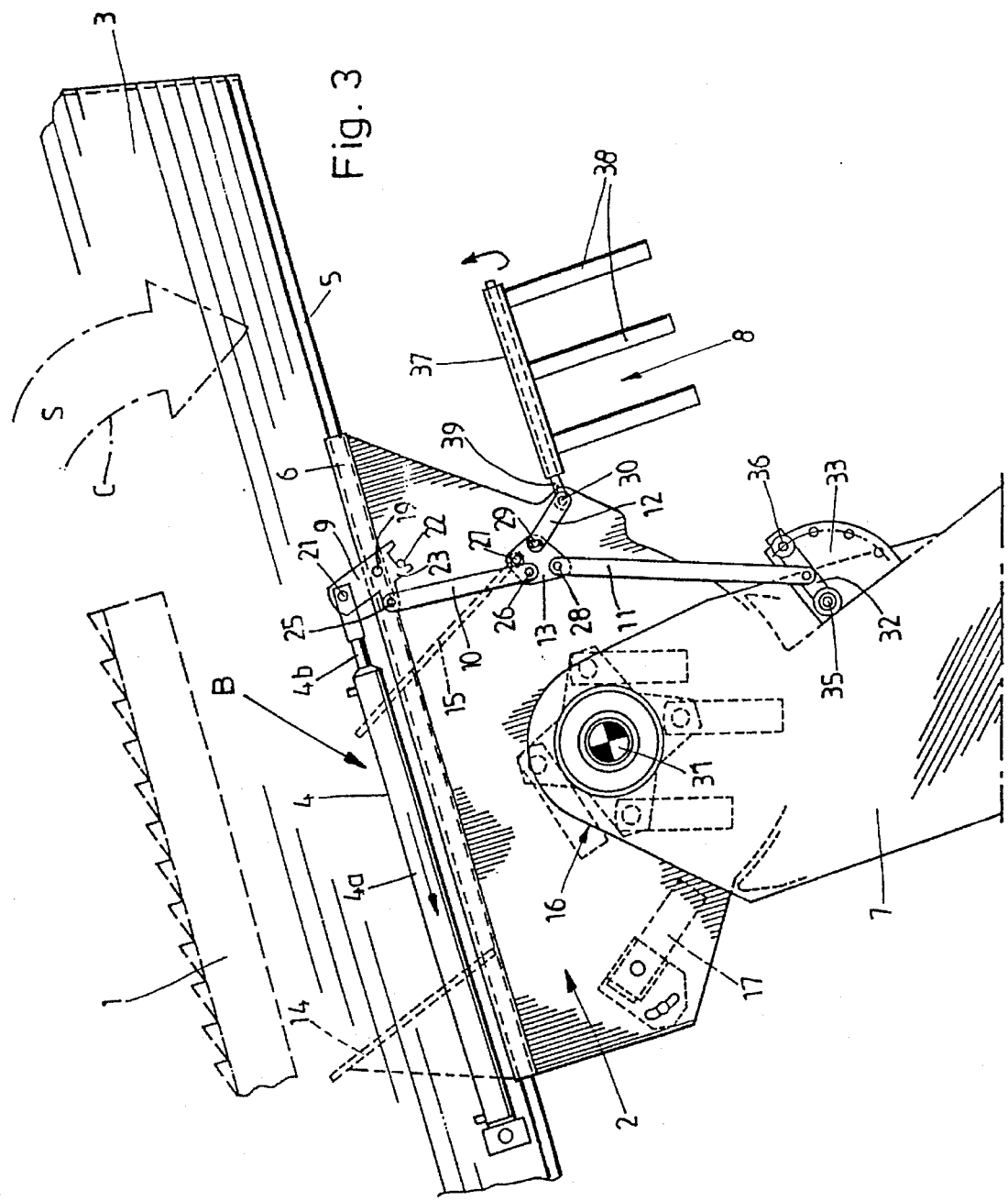
FIG. 3, a side view of the straw chopper in the arrangement in which it is displaced into the nonworking position.

In FIG. 3, the straw chopper (2) is retracted into its nonworking position (B), and the straw guide rakes (8) are pivoted away from the straw hood (3) and the chopper (2) and are pivoted about their rods (39) with the tines (38) downward by their own weight, so that between their tines (38), the two lateral straw guide rakes (8) form a defining space for the straw (S).

The straw (S) can now, from the outlet end of the straw hood (3), pass unchopped in the direction of the arrow "C", between the straw rakes (8), onto the field.

Figure 2:
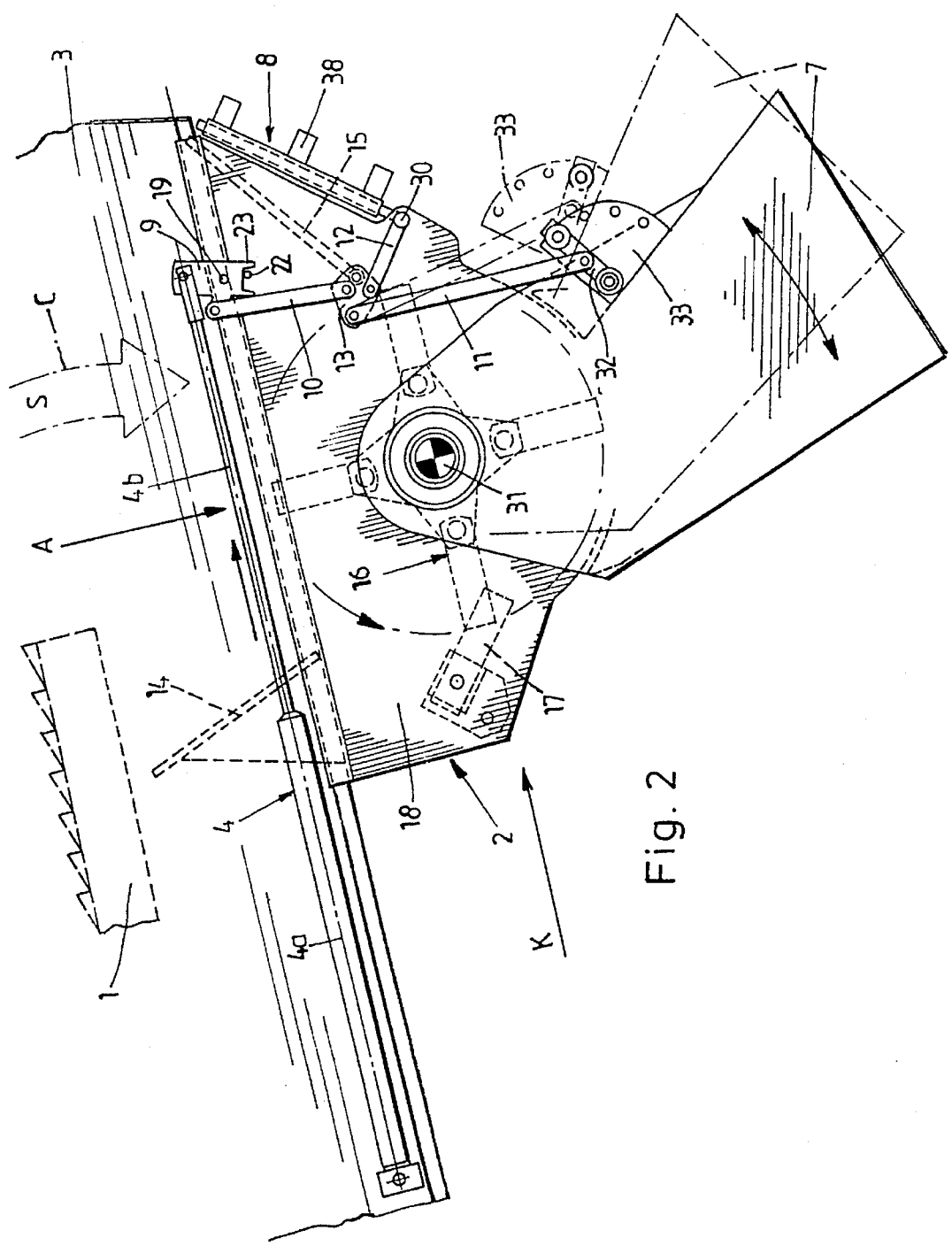
FIG. 2, a side view of the straw chopper in the arrangement in which it is displaced into the chopping position.

In FIGS. 2 and 4, the chopper (2) has been moved into its working position; by extension of the piston rod (4b), the straw chopper housing (18) has been displaced on the guides (5, 6) to beneath the outlet end of the straw hood (3).

When the piston rod (4b) is extended, first the control and pivoting part (9) is pivoted about its stationary shaft (19) in the direction of the arrow (D); via the leverlike extension (24), the first lever (10) is pulled upward in the direction of the arrow "E", and as a result the gusset plate (13) is pivoted about its stationary shaft (27) in the direction of the arrow "F", and thus the lever (11) is pivoted in the direction of the arrow "G" and the lever 12 in the direction of the arrow "H", as a result of which the discharge hopper (7) is pivoted about the rotor (31) into its discharge position, and the straw guide rakes (8) are pivoted upward with the shaft (30) to meet the straw chopper housing (18). As soon as the stop (41) of a straw guide rake (8) strikes the control piece (40), the tube (37) with the tines (38) and the rod (39) are rotated, and the tines (38) pivot inward in the direction of the arrow "I". When the gusset plate (13) is pivoted about its stationary shaft (27), the straw baffle (15) connected to the gusset plate (13) in a manner fixed against relative motion is pivoted outward (rearward), and then with the fixed straw baffle (14) forms an inlet funnel for the straw (S) (see FIG. 2).

The straw (S) then drops from the threshing and separator apparatus (1) in the direction of the arrow "C" into the funnel formed by the baffles (14, 15) and is chopped in the chopper (2) and discharged from the discharge hopper (7).

The motions of the coupling members (9–13) are indicated by the arrows in FIG. 4, as the straw guide rakes (8) are pivoted upward and inward. As shown in FIG. 5, with the arrow "I", indicates the inward swiveling of the tines (38).

When the piston rod (4b) is extended, the control and pivoting part (9) is pivoted about a limited angle, far enough that the slaving fork (23), at one end, strikes the stop (22) (FIG. 4). The actuation of the coupling members (10–13) takes place in this pivot angle range.

As the piston rod (4b) approaches closer, the straw chopper (2) is then displaced in the direction of the arrow "K" to the working position "A" (FIG. 2 and 4), via the nonpositive engagement between the slaving fork (23) and the stop (22).

When the piston rod (4b) is retracted, the same motions then take place in reverse order, and the straw chopper (2) is moved into the nonworking position of FIG. 3; the straw baffle (15) is then pivoted inward, and the straw guide rake (8) is pivoted outward and downward (FIGS. 1 and 3).

The tube (37) of the straw guide rake (8) has a groove (42) extending in the pivoting direction and engaged by a pin (43) of the rod (39). As a result, the pivoting motion of the tube (37) with the tines (38) downward and outward into the functional position of FIG. 3, into which the tube (37) with the tines (38) automatically swivels back by its own weight, is limited.

What is claimed:

1. A combine comprising a straw chopper, to a rear of a threshing and separator apparatus, the straw chopper being shiftable in a displacement motion on a straw hood into a work position (A) and a nonworking position (B), via a fluid pressure cylinder (4), wherein the straw chopper (2) is displaceably supported on guides (5,6) of the straw hood (3) and is movable into the work position (A) and nonworking position (B) by means of the fluid pressure cylinder (4), a discharge hopper (7) of the straw chopper (2) and a straw guide rake (8) disposed on the straw chopper (2) being pivoted into a working position (A) and a nonworking position (B) as a function of the displacement motion of the straw chopper (2) via coupling members (9–13).

2. The combine of claim 1, wherein the straw chopper (2) has a fixed straw baffle (14) and a straw baffle (15) that is pivotable into a straw entry position and a straw diversion position as a function of the displacement motion of the straw chopper (2) via the coupling members (9–13).

3. The combine of claim 1, wherein the straw chopper (2) is supported, by a straw chopper housing (18) that houses a cutting rotor (16) and a counterpart knife (17), so as to be displaceable with profile rails (6) on guide rails (5) under the straw hood (3), and the pressure fluid cylinder (4), embodied as a pressure-tension cylinder that can be acted upon on both ends, is supported by a cylinder housing (4a) on the straw hood (3), and a piston rod (4b) indirectly engages a rear end of the straw chopper housing (18).

4. The combine of claim 3, wherein the piston rod (4b) of the pressure fluid cylinder (4) is pivotably connected to a control and pivoting part (9), which is limitedly pivotable about a horizontal shaft (19) on the straw chopper housing (18), the control and pivoting part (9) controlling movement of the coupling members (10–13) and the displacement of the straw chopper (2).

5. The combine of claim 4, wherein the control and pivoting part (9) is pivotably supported as a multiple-armed lever about the shaft (19) which is fixed in stationary fashion on the profile rail (6) of the straw chopper housing (18), a fork element (20) on a first side of the shaft (19) for pivotable connection of the piston rod (4b) of the pressure fluid cylinder (4) to a horizontal shaft (21), a pivot limitation and slaving fork (24) on the other side of the shaft (19), cooperating with a stop (22) on the straw chopper housing (18) in two pivoted positions, said control and pivoting part (9) also having a leverlike extension (24) extending longitudinally of the pressure fluid cylinder (4).

6. The combine of claim 5, wherein a first lever (10) is pivotably connected at a first one end to a horizontal pivot shaft (25) to the slaving fork (24) of the control and pivoting part (9), said pivot shaft (25) being pivotably connected at a second end, via a horizontal shaft (26), to a gusset plate (13) that is pivotably supported about a fixed horizontal shaft (27) on the straw chopper housing (18);

a second lever (11) is pivotably connected at a first end to a horizontal shaft (28) on the gusset plate (13) and a second end of the second lever adjustably engaged to the discharge hopper (7) of the straw chopper (22), and a third lever (12) is supported pivotably at a first end on the gusset plate (13) to a horizontal shaft (29), a shaft (30) rotatably supported in the straw chopper housing (18), a second end of said third lever fixed on said shaft (30) with the straw guide rake (8) secured in a fixed manner against relative motion.

7. The combine of claim 6, wherein the pivotable straw baffle (15) is secured to the pivotable gusset plate (13) and can be swiveled about the horizontal shaft (27).

8. The combine of claim 6, wherein the discharge hopper (7) is pivotably supported about a pivot axis of a rotor (31), and the lever (11) it is pivotably connected to an adjusting lever (32), which is adjustably secured to a plate with holes (33) secured to the discharge hopper (7), to allow adjustment of the size of the pivot angle of the discharge hopper (7).

9. The combine of claim 8, wherein the stationary shaft (27) of the gusset plate (13) rests with the shafts (26, 28, 29) of the three levers (10, 11, 12) on the corners of a quadrilateral, preferably a trapezoid.

10. The combine of claim 6, wherein the coupling members formed by the gusset plate (13), the three levers (10, 11, 12), and the control and pivoting part (9), are disposed on at least one side of the straw chopper (2) and are actuatable by the pressure fluid cylinder (4).

11. A combine comprising a straw chopper, to a rear of a threshing and separator apparatus, the straw chopper being shiftable in a displacement motion on a straw hood into a work position (A) and a nonworking position (B), via a fluid pressure cylinder (4), wherein the straw chopper (2) is displaceably supported on guides (5, 6) of the straw hood (3) and is movable into the work position (A) and nonworking position (B) by means of the fluid pressure cylinder (4), a discharge hopper (7) of the straw chopper (2) and a straw guide rake (8) disposed on the straw chopper (2) being pivoted into a working position (A) and a nonworking position (B) as a function of the displacement motion of the straw chopper (2) via coupling members (9–13); and wherein the straw guide rake (8) has a tube (37) with tines (38), the tube (37) is supported rotatably by a limited angle about a rod (39) secured to the shaft (30), and the tube (37) with tines (38) is pivotable about the rod (39) toward the middle of the combine, by means of a control piece (40) secured to the straw chopper housing (18) and by means of a stop (41) mounted on the tube (37), when the straw guide rake (8) is pivoted upward.

12. A combine comprising a straw chopper, to a rear of a threshing and separator apparatus, the straw chopper being shiftable in a displacement motion on a straw hood into a work position (A) and a nonworking position (B), via a fluid pressure cylinder (4), wherein the straw chopper (2) is displaceably supported on guides (5,6) of the straw hood (3) and is movable into the work position (A) and nonworking position (B) by means of the fluid pressure cylinder (4), a discharge hopper (7) of the straw chopper (2) and a straw guide rake (8) disposed on the straw chopper (2) being pivoted into a working position (A) and a nonworking position (B) as a function of the displacement motion of the straw chopper (2) via coupling members (9–13); and wherein one of said straw guide rake (8) is respectively disposed on each side of the straw chopper (2) and each said straw guide rake (8) is secured to a common continuous shaft (30) and can be swiveled toward one another, each said straw guide rake by means of a respective stop (41) cooperating with a control piece (40).

* * * * *